United States Patent
Shimo et al.

[11] Patent Number: 5,953,301
[45] Date of Patent: Sep. 14, 1999

[54] LENS-CLEANING DISC WITH ANGLED BRUSH WITH ADHESIVE

[75] Inventors: Masanori Shimo, Gose; Yoshinori Matsui, Kashiba, both of Japan

[73] Assignee: Sharp Kabushiki Kaisha, Osaka, Japan

[21] Appl. No.: 08/736,290

[22] Filed: Oct. 24, 1996

[30] Foreign Application Priority Data

Oct. 27, 1995 [JP] Japan ................................. 7-280699

[51] Int. Cl.⁶ .............................. G11B 3/58; G11B 5/02; G11B 5/10
[52] U.S. Cl. .............................. 369/71; 369/71; 369/292; 360/128; 15/160; 15/DIG. 14
[58] Field of Search ..................... 369/71, 292; 360/128; 15/160, 1.51, 21.1, DIG. 14, DIG. 5, DIG. 6

[56] References Cited

U.S. PATENT DOCUMENTS 5,040,160  8/1991  Moriya ........................................ 369/71

FOREIGN PATENT DOCUMENTS

| | | |
|---|---|---|
| 1-105371 | 4/1989 | Japan ........................................ 369/71 |
| 143386 | 9/1989 | Japan . |
| 2-31339 | 2/1990 | Japan ........................................ 369/71 |
| 3-212827 | 9/1991 | Japan ........................................ 369/71 |
| 4163778 | 6/1992 | Japan . |
| 594632 | 4/1993 | Japan . |
| 5197993 | 8/1993 | Japan . |
| 612828 | 1/1994 | Japan . |
| 1 574 383 | 9/1980 | United Kingdom ..................... 369/71 |
| 2278710 | 12/1994 | United Kingdom . |
| WO 9628817 | 9/1996 | WIPO . |

OTHER PUBLICATIONS

JP 5–040955—Patent Abstracts of Japan—Feb. 19, 1993.
JP 5–144057—Patent Abstracts of Japan—Jun. 11, 1993.

Primary Examiner—Stuart S. Levy
Assistant Examiner—Tod Kupstas

[57] ABSTRACT

A lens-cleaning disc capable of efficiently removing dirt or dust on pickup lenses, equipped with a brush body comprising bristles fastened into the brush base, at a position facing the pickup lens when the disc is used, wherein the surface of the brush base may be constructed as an adhesive surface or the brush body may be placed at an angle with respect to a radial direction of the disc so that its inner end is located further forward than its outer end in the direction of rotation at all times during rotation of the disc.

12 Claims, 7 Drawing Sheets

LENS-CLEANING DISC WITH ANGLED BRUSH WITH ADHESIVE

BACKGROUND OF THE INVENTION

1. Field of the Invention

The present invention relates to an improvement in discs for cleaning pickup lenses which are used in optical information recording/reproducing apparatuses.

2. Description of the Related Art

Pickup lenses, which are located in optical information recording/reproducing apparatuses at a position facing the disc, are required to have excellent optical performance for reproduction of high-density signals. Deposition of dust or dirt on pickup lenses results in lower optical performance.

Therefore, dirt or dust on pickup lenses is recently removed by using lens-cleaning discs.

Lens-cleaning discs are provided with brushes located at a position facing the pickup lenses, and are designed so as to remove dirt or dust deposited on pickup lenses by the brushes when used and rotated in the same manner as ordinary optical discs.

Lens-cleaning discs of the prior art, however, have a problem in that dirt or dust, which has been removed from pickup lenses by the brushes and is flying or suspended around the pickup lenses, redeposits on the pickup lens surfaces, and this eventually results in unsatisfactory removal of dirt or dust from the pickup lenses.

SUMMARY OF THE INVENTION

In view of the circumstances of the prior art, it is an object of the present invention to provide a lens-cleaning disc with excellent dirt or dust-removal performance.

In one aspect of the invention, there is provided a lens-cleaning disc with a brush body comprising bristles fastened into the brush base, at a position facing the pickup lens when the disc is used, wherein the surface of the brush base is constructed as an adhesive surface.

Since the surface of the brush base is constructed as an adhesive surface as mentioned above, dirt or dust removed from the surface of a pickup lens by the brush body deposits on the brush base.

Since the brush body is preferably provided in a rotatable manner in the foregoing configuration, the contact resistance produced on contact of the brush body with a pickup lens surface is minimized.

In another aspect of the invention, there is provided a lens-cleaning disc provided with a brush body at a position facing the pickup lens when the disc is used, wherein the brush body is placed at an angle with respect to a radial direction of the disc so that its inner end is located further forward than its outer end in the direction of rotation at all times during rotation of the disc.

The configuration mentioned above allows dirt or dust removed by the brush body placed at an angle in a predetermined direction, to be directed outward over the disc surface.

In addition, when the disc is held in a cartridge shell and used to remove dirt or dust on the surface of a pickup lens, the brush body sinks into the cartridge shell via an opening in the cartridge shell through which the brush body is exposed. Here, since the brush body is placed at an angle, the contact resistance between the brush body and an opening-side edge of the cartridge shell is lowered.

Further, the function of directing of the dirt or dust is accomplished by tilting the brush body, preferably at an angle of 5–90° in the above configuration.

In addition, more preferably, by making conductive the disc and/or the brush body, generation of static electricity on the pickup lens is prevented, or generated static electricity is eliminated in the above configuration.

As is apparent from the foregoing description, according to the invention, since dirt or dust removed by the brush body from the surface of a pickup lens is attracted to the brush base surface, redeposition thereof on the pickup lens is prevented, and this results in increased dirt or dust-removal efficiency of the brush body.

In addition, in cases where the above configuration is modified to allow rotation of the brush body, the contact resistance produced when the brush body comes into contact with the pickup lens surface is minimized, and this not only results in less damage to the brush body, but also prevents failure of the drive unit due to increased torque of the disc.

Also, according to the invention, since redeposition of the dirt or dust on the pickup lens is prevented by directing the dirt or dust removed by the brush body from the pickup lens surface, outward over the disc surface, and this results in increased dirt or dust-removal efficiency of the brush body.

In addition, when the disc is held in a cartridge shell and used to remove dirt or dust on the surface of a pickup lens, since the contact pressure between the brush body and an opening-side edge of the cartridge shell is minimized, the damage to the brush body is minimized as well, and failure of the drive unit due to increased torque of the disc is prevented.

Furthermore, by making conductive the disc and/or the brush body, production of static electricity on the pickup lens is prevented, or the produced static electricity is eliminated, and this reliably prevents redeposition of the dirt or duct on the pickup lens.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
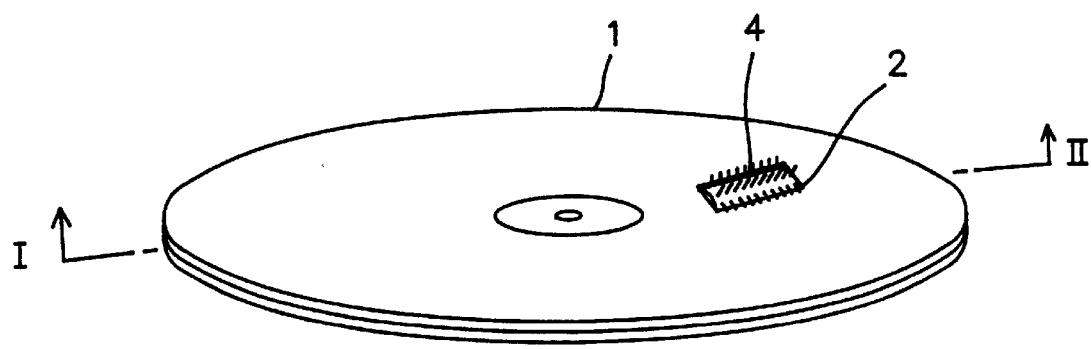
FIG. 1 is an external perspective view of a lens-cleaning disc according to a first embodiment of the present invention.

Now referring to the drawings, preferred embodiments of the invention are described below.

First Embodiment

Figure 2:
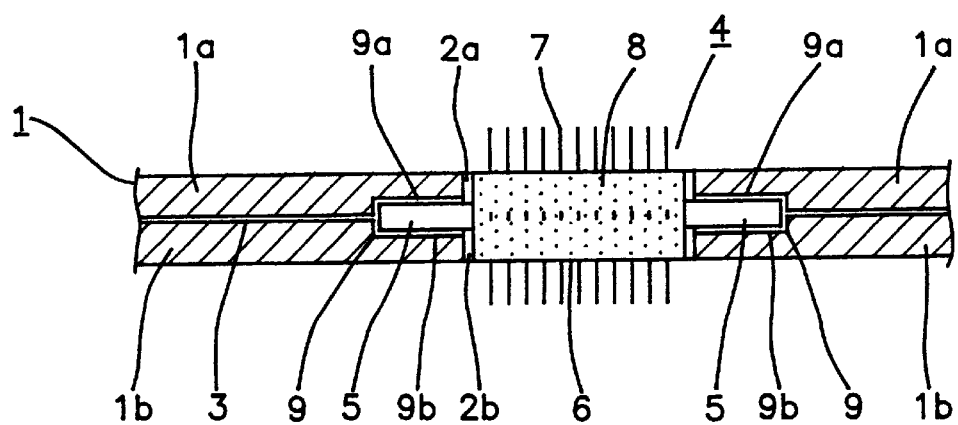
FIG. 2 is a cross sectional view of the lens-cleaning disc in FIG. 1, taken on line I–II.

FIG. 1 is a perspective view of a lens-cleaning disc according to a first embodiment of the present invention, and FIG. 2 is a cross sectional view taken on line I–II in FIG. 1.

The lens-cleaning disc 1 is equipped with a radially extending rectangular opening 2 located at a position facing the pickup lens, with a brush body 4 provided in the opening 2 in a rotatable manner.

The brush body 4 is made of a molded product of elastic resin, and comprises a cylindrical brush base 6 the top surface of which is coated with an adhesive 8, with rotating shafts 5 extending from both sides of the brush body 4, and bristles 7 fastened into the surface.

The disc 1 is constructed of two disc plates 1a and 1b which are layered with a adhesive (releasable) 3, wherein the upper disc plate 1a has twin recessed areas 9a on the underside thereof which radially extend outward from the shorter sides of the opening 2, while the lower disc plate 1b has twin recessed areas 9b on the upside thereof which radially extend outward from the shorter sides of the opening 2, and the recessed areas 9a and 9b form bearing sections 9 along the shorter sides of the opening 2 in the disc 1 when the disc plates 1a, 1b are combined. The rotating shafts 5 are held in the respective bearing sections 9 to allow mounting of the brush body 4 in the opening 2 in a rotatable manner.

The brush body 4 is mounted by bending the entirety by using the elasticity of the brush body 4 to insert the respective rotating shafts 5 into the bearing sections 9, and the brush body 4 is designed in such a manner that it may be removed and replaced by a fresh one when the adhesive strength of the surface of the brush base 6 is lowered or much dirt or dust deposits on the bristles 7.

The foregoing configuration allows the bristles 7 of the brush body 4 to come into contact with the surface of a pickup lens to remove dirt or dust on the surface when the disc 1 is mounted in a drive unit and rotated for use. Since most of the dirt or dust flying as a result of removing deposits on the surface of the brush base with the adhesive 8 attached thereto, there is little chance that the dirt or dust once removed from the surface of the pickup lens will redeposit on the surface of the pickup lens.

Since the brush body 4 rotates, the contact resistance due to contact of the bristles 7 with the pickup lens is minimized, and this not only results in less damage to the brush body 4, but also prevents failure of the drive unit which results from increased torque of the disc 1.

Second Embodiment

Figure 3:
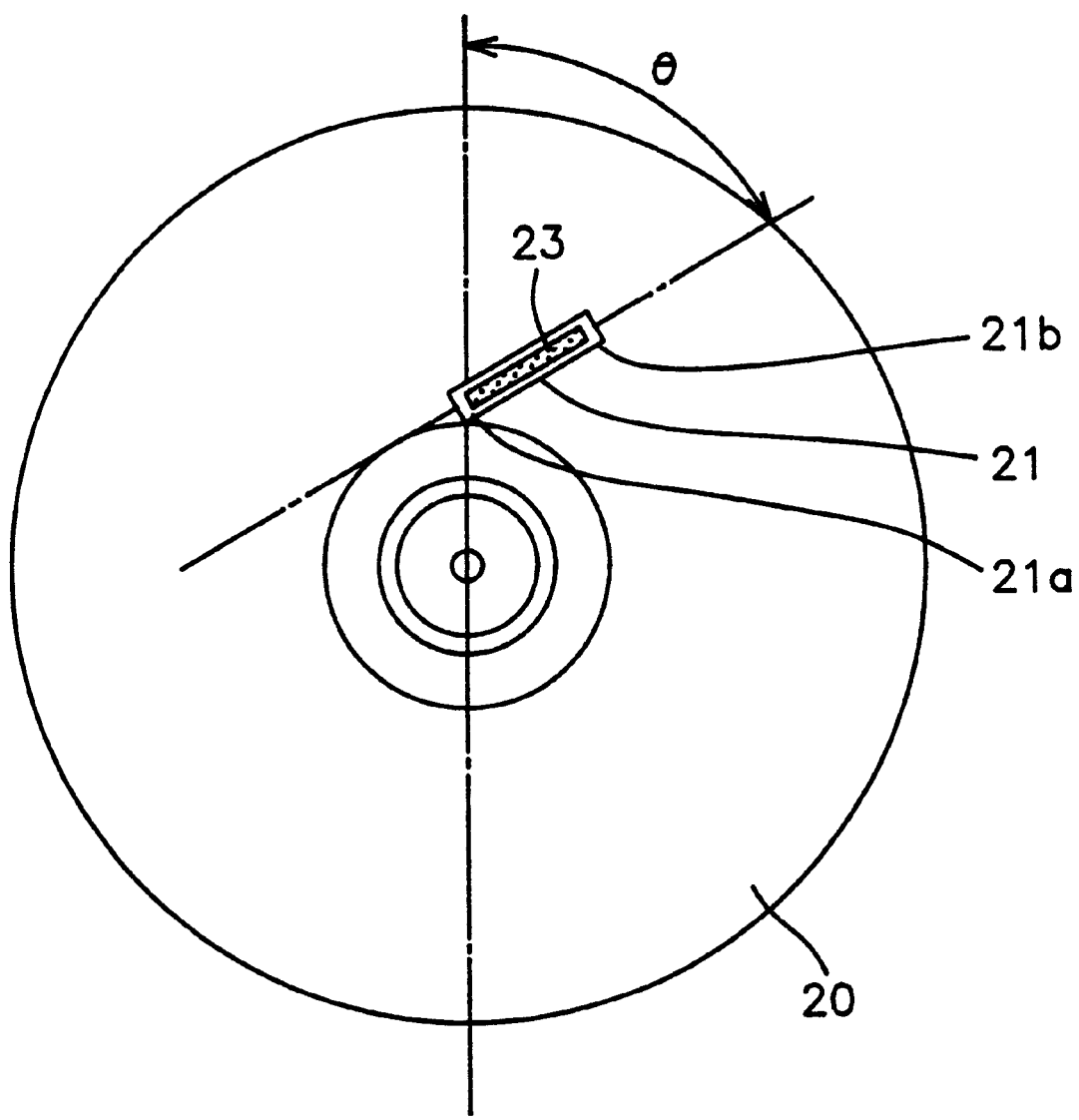
FIG. 3 is a plan view illustrative of a lens-cleaning disc according to a second embodiment of the invention.
Figure 4:
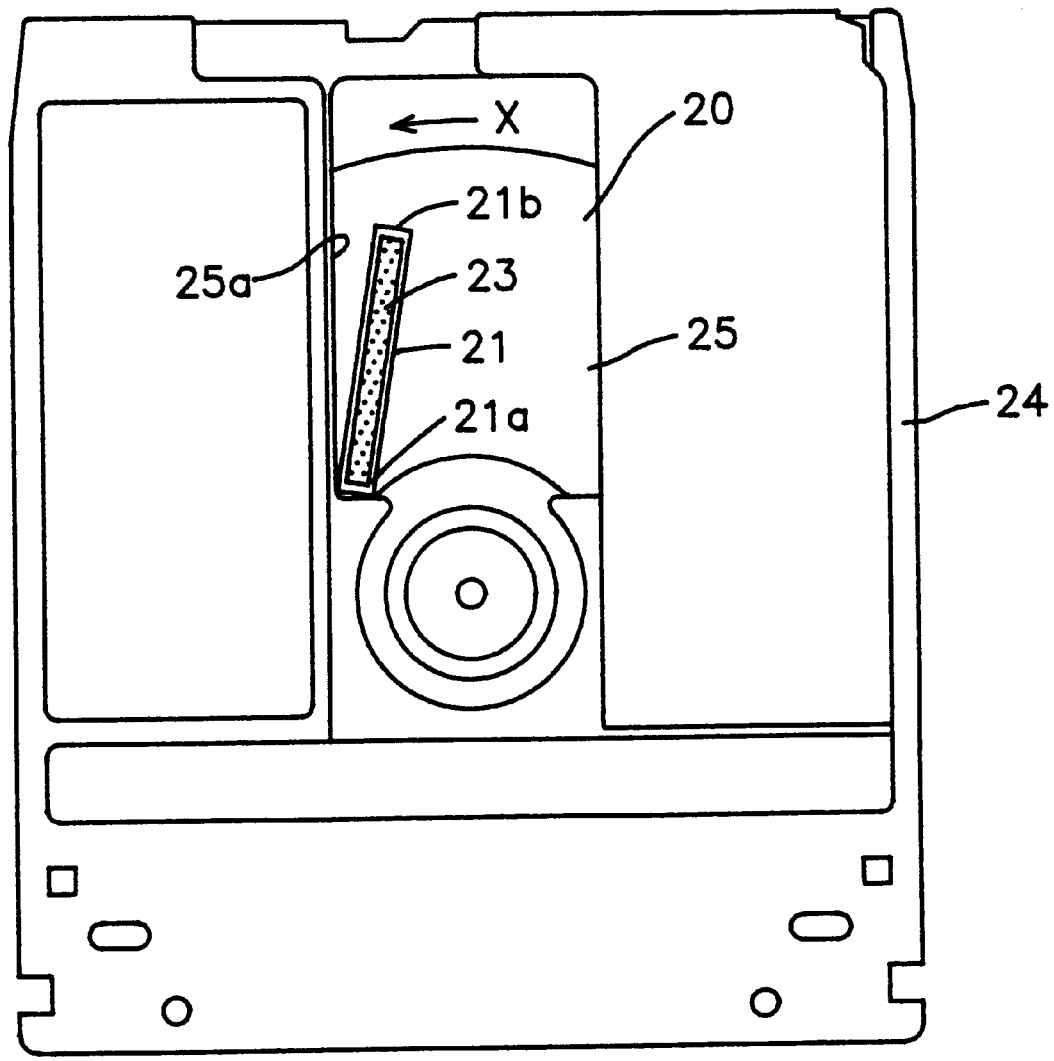
FIG. 4 is a plan view of a disc cartridge fitted with the lens-cleaning disc illustrated in FIG. 3.

FIG. 3 is a plan view of a lens-cleaning disc according to a second embodiment of the invention, and FIG. 4 is a plan view of a lens-cleaning disc cartridge with the disc held in the cartridge shell.

The lens-cleaning disc 20 is equipped with a brush body 21 which is located at a position facing the pickup lens, with a tilt angle θ on the order of 60° from a radial direction of the disc 20 so that the inner end 21a is located further forward than the outer end 21b in the direction of rotation when the disc 20 is rotated. The configuration and preparation of the brush body 21 will be later explained in detail.

The cartridge shell 24 has a rectangular opening 25 to expose the brush body 21, with tips of bristles 23 of the brush body 21 protruding through the opening 25 for contact with a pickup lens. The length of the protrusion must be large enough to remove dirt or dust on the surface of the pickup lens to a satisfactory degree. Assuming that the disc 20 is rotated in the direction indicated by X in FIG. 4 to clean a pickup lens, the tips of the bristles 23 hit a side edge 25a of the cartridge shell 24 at the side of the opening 25 and are then bent to sink into the cartridge shell 24.

Figure 5:
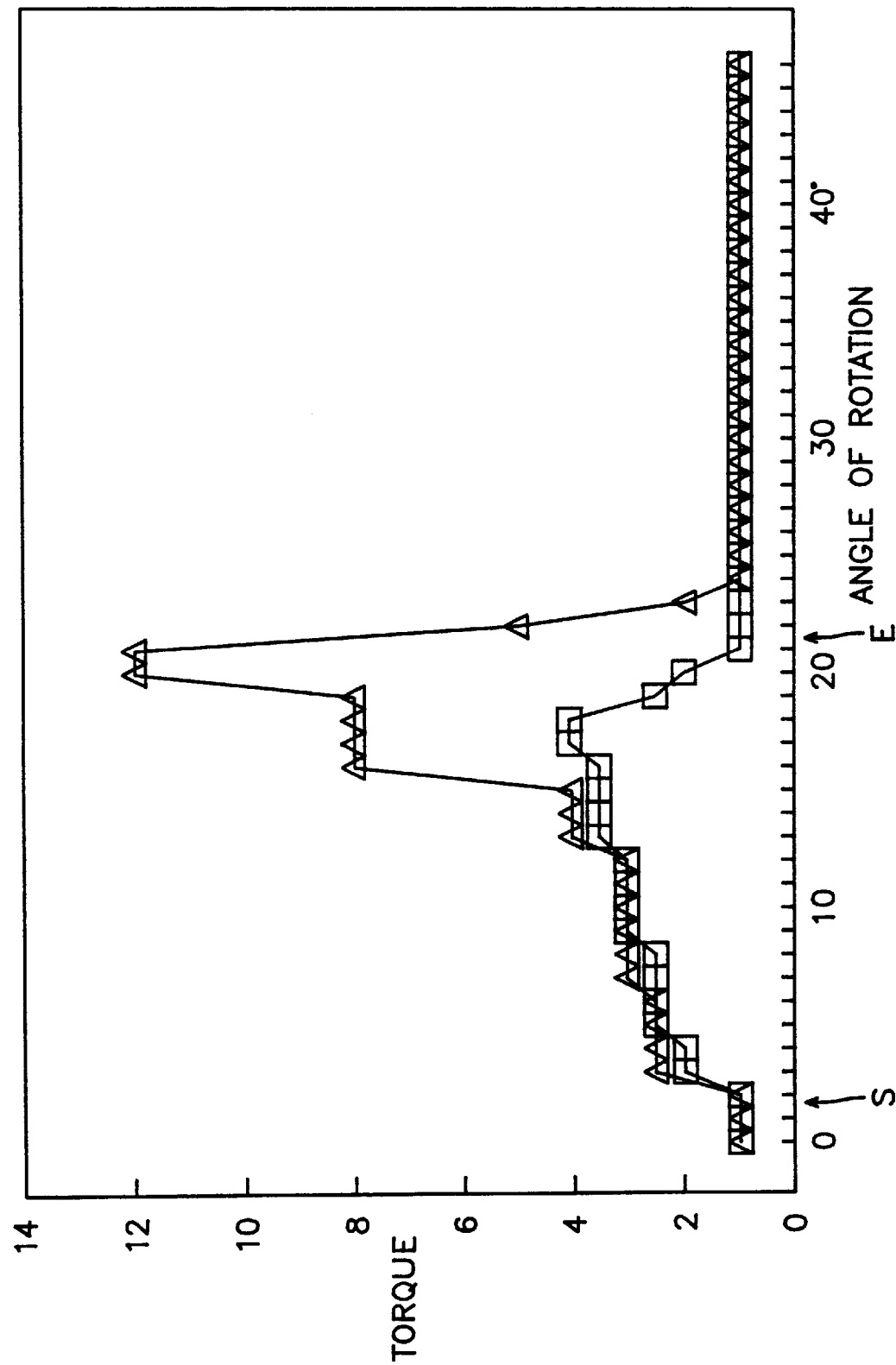
FIG. 5 is a graph illustrating torque.

FIG. 5 is a graph illustrating change in torque which the disc 20 receives during operation (□ represents performance of the present embodiment, while Δ represents performance of a comparative example).

In the graph, the range of angles of rotation between S and E roughly matches the time during which the bristles 23 of the brush body 21 are in contact with a side edge 25a of the cartridge shell 24 at the side of the opening 25. Outside the range of angles of rotation between S and E, that is, during a period of time in which the entire brush body 21 has been inserted in the cartridge shell 24 and during a period of time in which the bristles 23 have not yet come into contact with the side edge 25a of the cartridge shell 24 at the side of the opening 25, the torque is small, since the bristles 23 are not in contact with the side edge 25a; the torque in this state is defined as "1". The torque gradually increases to a level of 3.8 during the contact period between S and E, but no further increase is observed. This is believed to be because since the brush body 21 is placed at an angle in a predetermined direction, the bristles of the brush body 21 hit the side edge 25a of the cartridge shell 24 at the side of the opening 25 successively in order from the inner end 21a to the outer end 21b, and thus no great contact resistance is produced. This configuration serves to lessen the damage to the bristles 23 of the brush body 21 and to prevent failure of the drive unit due to increased torque of the disc 20.

Figure 6:
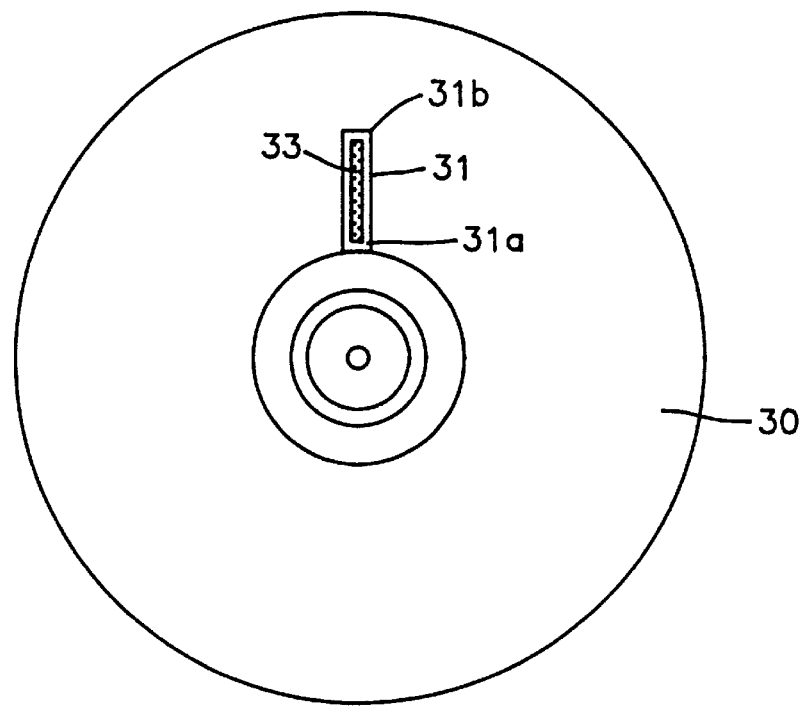
FIG. 6 is a plan view of a lens-cleaning disc of the prior art.
Figure 7:
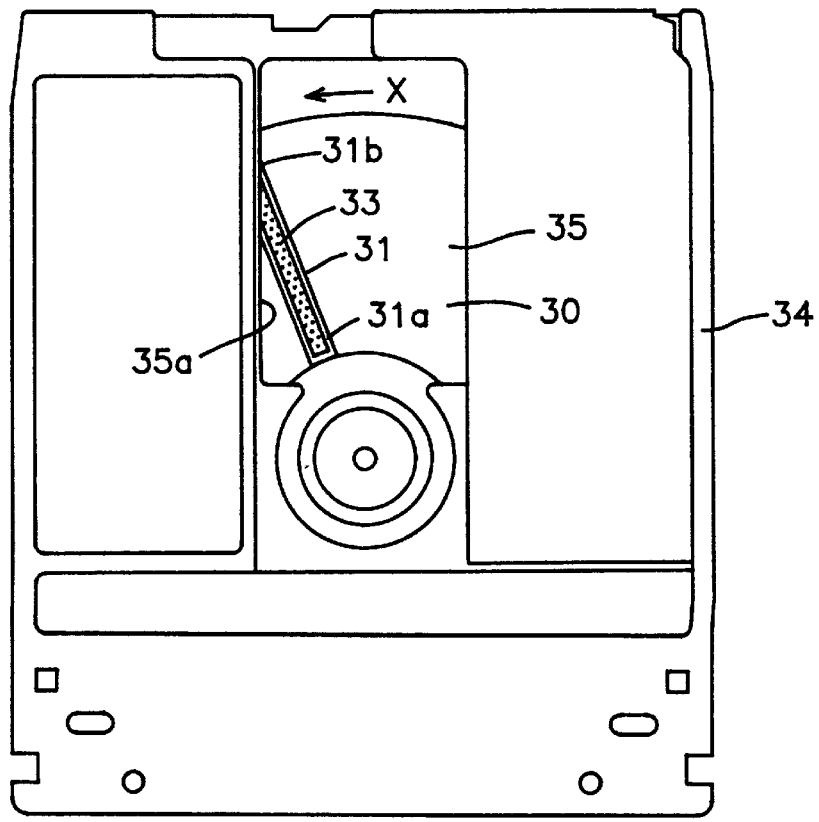
FIG. 7 is a plan view of a disc cartridge fitted with the lens-cleaning disc illustrated in FIG. 6.

As illustrated in FIG. 6 and FIG. 7, the comparative example is one with a conventional structure wherein the brush body 31 is attached along a radius of the disc 30. With the comparative example, the torque rapidly increases to a level of "8" to "12" in the latter half of the range of angles of rotation between S and E. With the comparative example, when the disc 30 is rotated in the direction indicated by X in FIG. 7, the bristles 33 of the brush body 31 hit an edge 35a of the cartridge shell 34 at the side of the opening 35 successively in order from the outer end 31b to the inner end 31a, becoming bent. Although the contact resistance to the outer end 31b portion is not high in the early stages, the bristles are bundled to greatly increase the contact resistance when the inner end 31a portion hits the edge 35a, thereby rapidly increasing the torque of the disc 30.

Figure 8:
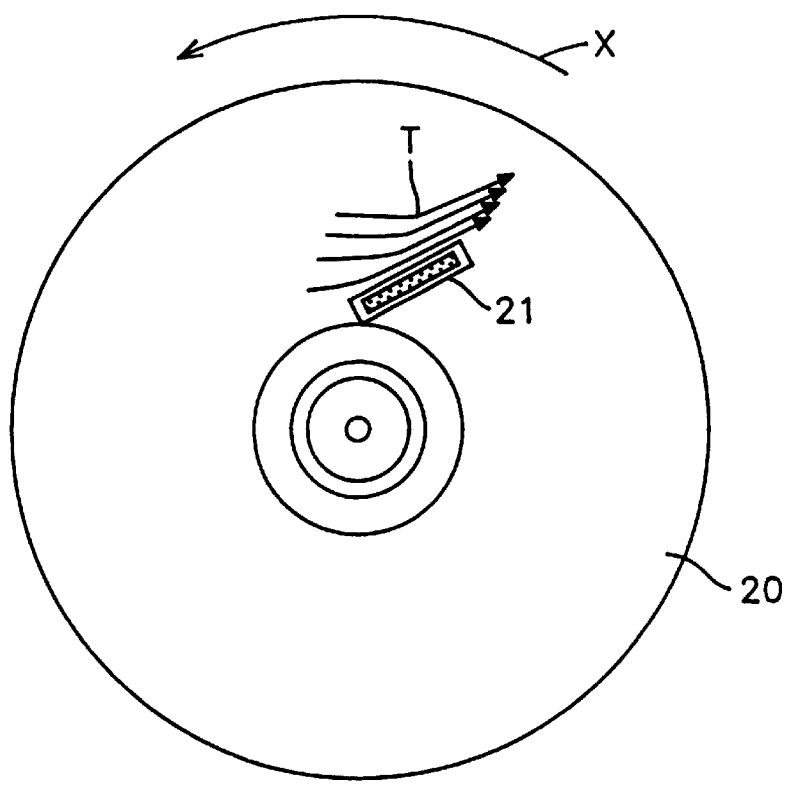
FIG. 8 is a plan view illustrating the state of creation of convection around the lens-cleaning disc illustrated in FIG. 3.
Figure 9:
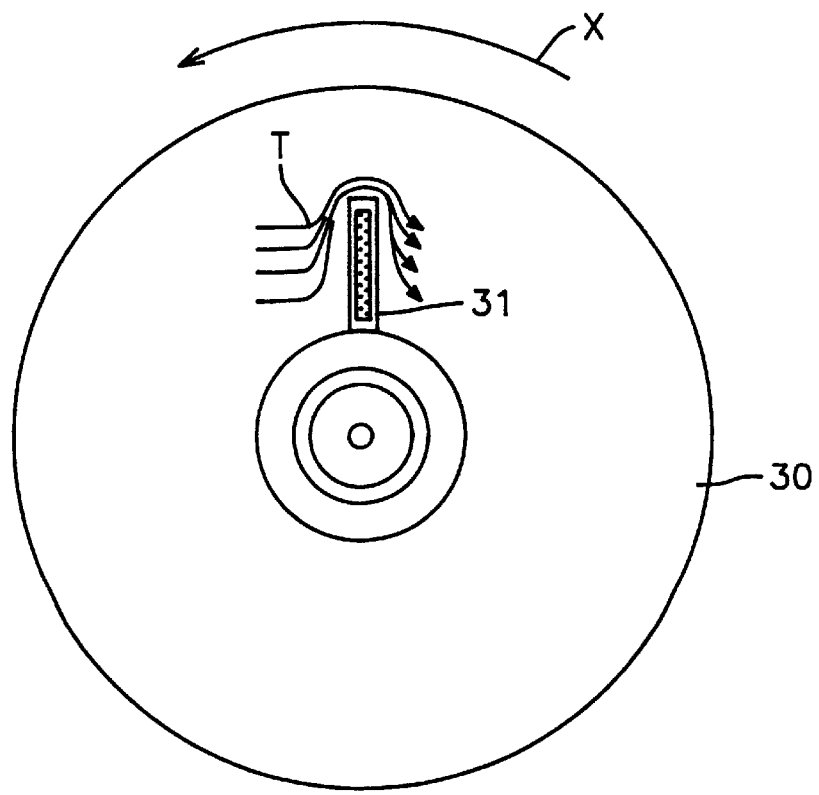
FIG. 9 is a plan view illustrating the state of creation of convection around the lens-cleaning disc illustrated in FIG. 6.

FIG. 8 illustrates the state of convection T which is created around a disc 20 according to the present embodiment when the disc 20 is rotated for use, whereas FIG. 9 illustrates the state of convection created when the comparative disc illustrated in FIG. 6 and FIG. 7 is used.

With the configuration according to the present embodiment wherein the brush body 21 is placed at an angle in a predetermined direction, when the disc 20 is rotated in the direction indicated by X in FIG. 4, the air which has hit the front-end of the brush body 21 is sent outward along the tilt surface of the brush body 21, and dirt or dust is sent outward over the disc 20. On the other hand, in the case illustrated in FIG. 9 where the brush body 31 is radially oriented, the air which has hit the front-end of the brush body 31, though being sent outward, moves toward the rear of the brush body 31 after having passed by the outer end of the brush body 31. Eventually, the dirt or dust is left in the inward portion over the disc 30 surface.

Figure 10:
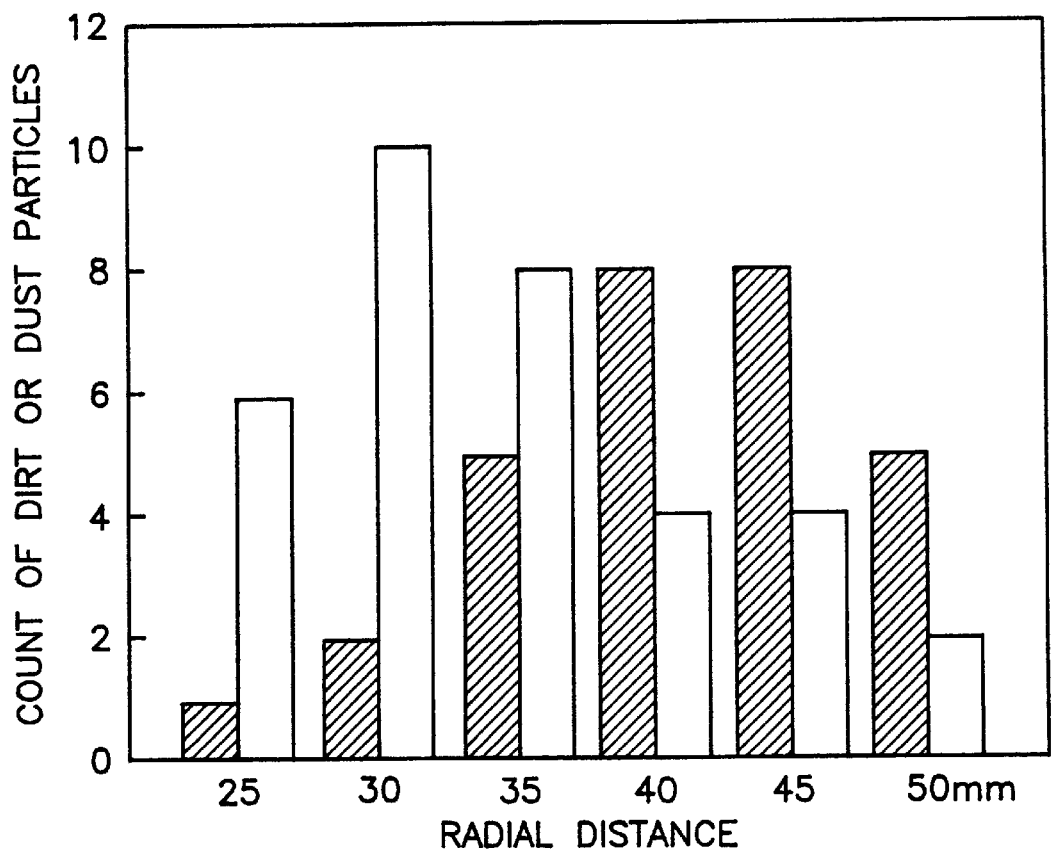
FIG. 10 is a graph illustrating distribution of dirt or dust on a disc.

FIG. 10 is a graph illustrating radial distribution of the number of dirt or dust particles. The experimental values listed were measured after a 1000-rotation cleaning operation. The diagonally hatched bars represent data of the present embodiment, and open bars represent performance of the comparative example.

The number of dirt or dust particles is determined based on the number in an area of 25-mm radius with the minimum number thereof defined as "1". When the present embodiment is used, much dirt or dust in an amount ranked between "5" and "8" is present within a 35 through 50-mm radius over the outward section of the disc 20 surface, whereas much dirt or dust in an amount ranked "10" is present over the inward section of the surface in the comparative example. Since currently-used pickup lenses are located at a radius of 27.5 mm of discs, and much dirt or dust is present at that position of the comparative example, dirt or dust once removed by the brush body soon redeposits on the pickup lens, thus lowering the effect of removal of dirt or dust by the brush body, whereas the removal effect of the present embodiment is greater, since no such redeposition occurs. The effect of directing the dirt or dust outward by convection is produced when the brush body is placed at an angle of 5–90° from a radius of the disc so that the inner end is located further forward than the outer end in the direction of rotation.

The configuration of the brush body will now be described.

The brush body 21 is rectangular in cross section, and is constructed by directly fusing or bonding to the disc a fiber-like workpiece made of a material such as acrylic, polypropylene, polyethylene, nylon, fluororesin or glass fiber, or by applying to the disc surface a workpiece woven into or fused or bonded to a base material such as a piece of cloth or solid matter made of a material selected from the resins mentioned above, a resin such as butyl rubber or silicone rubber, cotton, silk, etc. When woven, the material is woven along the length of the brush body 21.

In addition, the brush body 21 is made conductive by mixing a conductive material such as carbon, metal, or metal oxide into a constituent raw material, or by coating the worked brush body 21 with a conductive material by plating, sputtering or evaporation. This serves to prevent electrostatic buildup on pickup lenses and to remove generated static electricity through the brush body 21 when dirt or dust on pickup lenses is attempted to be removed by the brush body 21.

In addition, the disc 20 is provided with a conductive coating on the surface by application of a resin, for example, ultraviolet-curing acrylic resin or acryl-urethane resin or thermosetting epoxy resin or silicone resin. This configuration serves to efficiently remove static electricity from the brush body 21 via the disc 20 surface.

With the present embodiment, since the effect of removing dirt or dust on or over the inward section of the disc 20 surface by convection is combined with the effect of preventing and removing static electricity on pickup lenses, redeposition of the dirt or dust on pickup lenses is reliably prevented.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A lens-cleaning disc for use in combination with a pickup lens, the disc comprising:

a brush body rotatively located at a position along a radius of the disc facing the pickup lens when the disc is used to clean the pickup lens, wherein the brush body has a rotary axis placed at an effective angle $\theta$ with respect to said radius of the disc so that the inner end of the brush body is located further forward than the outer end, wherein air which hits the front of the brush body causes dust to be sent outward over the disc.

2. The lens-cleaning disc according to claim 1, wherein said angle is from about 5 to about 90°.

3. The lens-cleaning disc according to claim 2, wherein said angle is about 60°.

4. The lens-cleaning disc according to claim 1, wherein the disc is electrically conductive.

5. The lens-cleaning disc according to claim 1, wherein the disc includes two separate portions secured together by adhesive.

6. The lens-cleaning disc according to claim 3, wherein the brush body is in part located within the disc.

7. The lens-cleaning disc according to claim 1, wherein the brush body has two extending shafts.

8. The lens cleaning disc according to claim 1, wherein the brush body is electrically conductive.

9. The lens-cleaning disc according to claim 1 wherein the disc includes an electrically conductive coating.

10. The lens-cleaning disc according to claim 1 wherein the brush body includes an electrically conductive coating.

11. The lens-cleaning disc according to claim 1 wherein the angle $\theta$ is an angle measured at the outer circumference of the disc between an axis of a diameter of the disc and longitudinal axis of the brush body.

12. A lens cleaning disc for use in combination with a pickup lens, the disc comprising:

a brush body including a brush base and bristles fastened to the brush base, the brush body being located along a radius of the disc a position facing the pickup lens when the disc is used to clean the pickup lens, wherein the surface of the brush base is constructed as an adhesive surface, and the brush body is placed at an effective angle with respect to said radius of the disc so that the inner end of the brush body is located further forward than the outer end thereof in the direction of rotation during rotation of the disc, wherein air which hits the front of the brush body causes dust to be sent outward over the disc.

* * * * *